US008407096B2

(12) United States Patent
Mathe et al.

(10) Patent No.: US 8,407,096 B2
(45) Date of Patent: Mar. 26, 2013

(54) METHOD FOR ORDERING GROUPS OF PRODUCTS

(75) Inventors: James G. Mathe, Menasha, WI (US); Christine R. Richards, Neenah, WI (US); Christine A. Mauthe, Neenah, WI (US)

(73) Assignee: Ziti Technologies Limited Liability Company, Dover, DE (US)

( * ) Notice: Subject to any disclaimer, the term of this patent is extended or adjusted under 35 U.S.C. 154(b) by 1289 days.

(21) Appl. No.: 10/746,123

(22) Filed: Dec. 24, 2003

(65) Prior Publication Data

US 2005/0177440 A1  Aug. 11, 2005

(51) Int. Cl.
*G06G 1/14* (2006.01)
*G06Q 20/00* (2006.01)

(52) U.S. Cl. .......................................... 705/22; 705/26.1

(58) Field of Classification Search .................... 705/22, 705/26
See application file for complete search history.

(56) References Cited

U.S. PATENT DOCUMENTS

| | | | | |
|---|---|---|---|---|
| 3,705,410 A | * | 12/1972 | Kooy et al. ........................ 705/8 |
| 5,135,344 A | * | 8/1992 | Kita et al. ...................... 414/273 |
| 5,161,929 A | * | 11/1992 | Lichti, Sr. ................. 414/331.04 |
| 5,472,309 A | * | 12/1995 | Bernard et al. ............... 414/807 |
| 6,026,378 A | * | 2/2000 | Onozaki .......................... 705/28 |
| 6,029,143 A | * | 2/2000 | Mosher et al. .................. 705/28 |
| 6,151,582 A | * | 11/2000 | Huang et al. ....................... 705/8 |
| 6,341,266 B1 | * | 1/2002 | Braun ............................... 705/7 |
| 6,622,127 B1 | * | 9/2003 | Klots et al. ....................... 705/28 |
| 6,847,941 B2 | * | 1/2005 | Ower .............................. 705/28 |
| 6,876,948 B1 | * | 4/2005 | Smith ........................... 702/181 |
| 6,879,962 B1 | | 4/2005 | Smith et al. |
| 6,889,197 B2 | | 5/2005 | Lidow |
| 6,974,928 B2 | | 12/2005 | Bloom |
| 2005/0144053 A1 | | 6/2005 | Mauthe et al. |

* cited by examiner

*Primary Examiner* — F. Zeender
*Assistant Examiner* — Christopher Buchanan
(74) *Attorney, Agent, or Firm* — Knobbe Martens Olson & Bear LLP

(57) ABSTRACT

The present invention relates to a method of sourcing orders for groups of products. The method includes arranging a plurality of products into several distinct groups of products based on a variety of factors, such as product demand and product configuration. In some forms, the method includes calculating more of the relevant costs that are associated with shipping groups of products from a plurality of sources. The method may also include assigning orders to sources based on the capacity of the sources to fill orders for groups of products. The method may also be used to ensure that one or more sources ship a minimum number of products per time period (e.g., a month, a year). In some forms, the method includes determining a storage capacity range for a plurality of containers and assigning orders for groups of products onto the containers based on the storage capacity of the containers.

21 Claims, 3 Drawing Sheets

METHOD FOR ORDERING GROUPS OF PRODUCTS

BACKGROUND

A typical order sourcing method assigns orders for numerous types of products to one of a plurality of available sources that ship the orders to a customer. The methods sometimes include forming multiple products into a plurality of distinct groups of products. The distinct groups of products are usually arranged according to various calculations that determine what groups of products should be shipped from a source to a customer.

There are some methods for ordering groups of products that include determining how the groups of products should be shipped. As an example, a method may include establishing what groups of products can be placed into a cube shape on a pallet or truck.

Some methods for ordering groups of products also examine prior customer demand in identifying the products that should be grouped together. The products are typically grouped together in order to minimize shipping costs yet meet customer demand.

The groups of products that are shipped to each customer from one or more sources are usually determined using complex software programs. In addition, the products are often regrouped due to changes in demand, changes in the distribution network, changes in the production footprint of one or more of the products, and/or changes in market trends.

SUMMARY OF THE INVENTION

The purposes and features of the present invention will be set forth in the description that follows. Additional features of the invention will be realized and attained by the product and processes particularly pointed out in the written description and claims hereof, as well as from the appended drawings.

In some forms, the present invention relates to a method of sourcing orders for groups of products. The method includes organizing a plurality of products into a plurality of distinct groups of products; and assigning the order to a first distribution center based on the capacity of each distribution center to ship the order.

In another form, the method includes organizing a plurality of products into a plurality of distinct groups of products; determining a cost to produce and ship each distinct group of products from each distribution center in a plurality of distribution centers; and assigning the order to a first distribution center based on the cost to produce and ship the order from each distribution center.

In still another form, the method includes organizing a plurality of products into a plurality of distinct groups of products; determining a storage capacity range for each one of a plurality of containers; assigning the order onto one of the containers if the order fits in the storage capacity range of the container.

In yet another example form, the method includes organizing a plurality of products into a plurality of distinct groups of products; determining a shipping capacity for each distinct group of products relative to each distribution center in a plurality of distribution centers; and assigning the order to a first distribution center in order to ship a minimum number of products from the first distribution center per time period.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the invention.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. Like parts depicted in the drawings are referred to by the same reference numerals.

DETAILED DESCRIPTION

Figure 1:
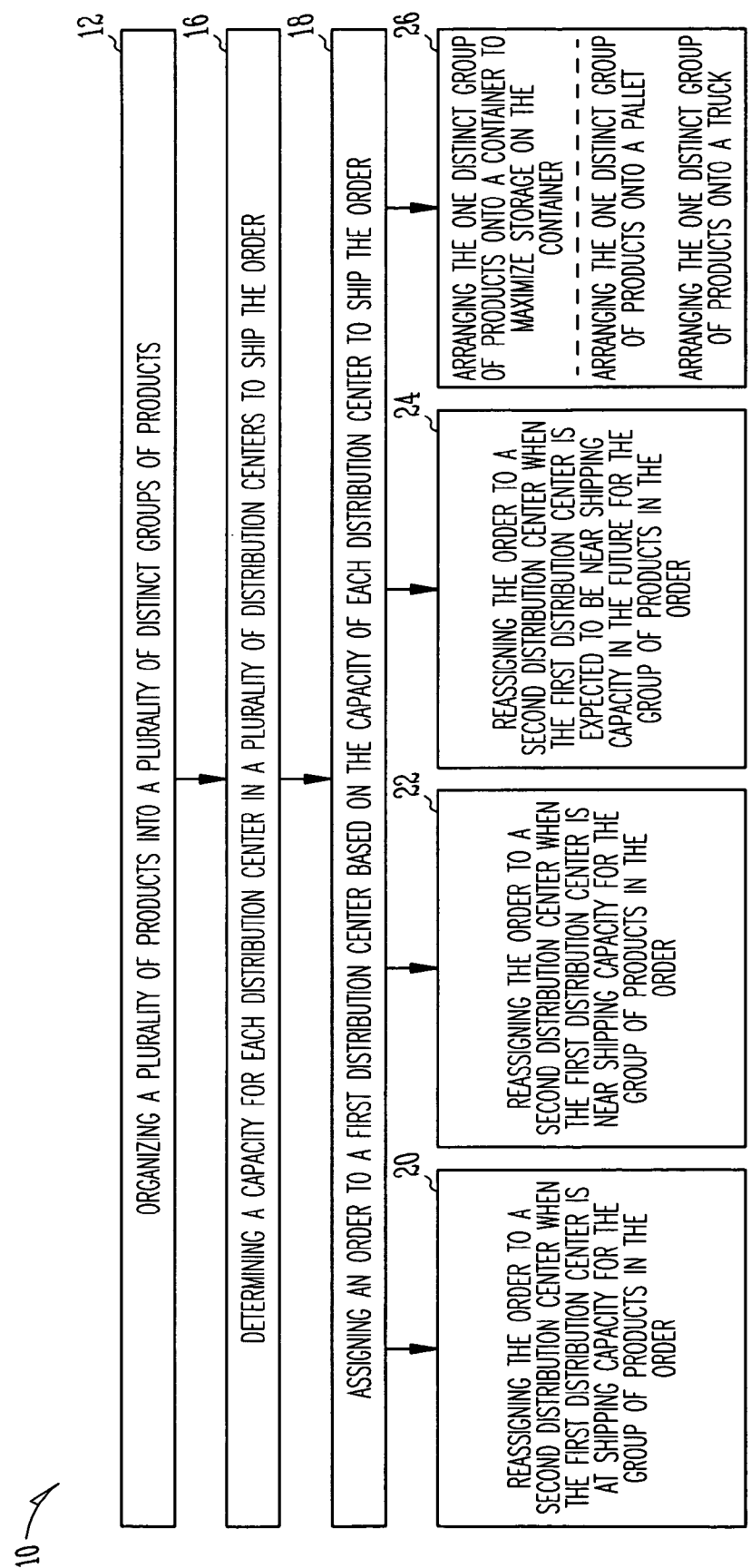
FIG. 1 illustrates a method of sourcing orders for groups of products.

In the following detailed description, reference is made to the accompanying drawings, which show specific embodiments in which the invention may be practiced. These embodiments are described in sufficient detail to enable those skilled in the art to practice the invention. It is to be understood that other embodiments may be utilized and structural changes made, such that the following detailed description is not to be taken in a limiting sense.

A method of sourcing orders for groups of products is described herein. In some forms, the method includes arranging a plurality of products into several distinct groups of products based on a variety of factors, such as product demand and product configuration. Arranging products into groups improves the logistics associated with shipping numerous types of products to multiple customers from multiple sources (e.g., mills, production centers, distribution centers or any other facilities that can be used to fabricate, ship and/or store products). Logistics are especially improved when customers require different groups of products at different locations and not every source is readily able to ship, store or produce every product.

In some forms, the method includes calculating more of the relevant costs that are associated with shipping groups of products from a plurality of sources. Many conventional methods calculate just the costs that are associated with shipping an order for one or more groups of products to a customer.

The method may also include assigning orders to sources based on the capacity of the sources to fill orders for groups of products. Assigning orders to sources based on the capacity of the sources (i) helps prevent over burdening the sources; and (ii) reduces the chance for customer service concerns within the sources.

The method may also be used to ensure that one or more sources ship a minimum number of products per time period (e.g., a month, a year). Shipping a minimum number of products per time period may be necessary to fulfill contracts with one or more of the sources. In addition, shipping a minimum number of products per time period from particular sources helps to ensure that certain production and/or distribution centers are available to fill orders during future time periods when there is a high demand for particular groups of products.

In some forms, the method includes determining storage capacity ranges for the containers (e.g., pallet or truck) that are used to ship orders for groups of products. Utilizing storage capacity ranges for the containers allows more orders for groups of products to be readily assigned to a container.

Associating storage capacity ranges with the containers that are used to ship groups of products may reduce the labor that is required to assign (or reassign) orders for groups of products to a source. In addition, using ranges to define container storage capacities may prevent splitting orders for groups of products onto separate containers. The container capacity ranges may also prevent an order for a group of products from being assigned to less than an optimal source because there in no longer such rigidity associated with assigning orders to containers.

FIG. 1 illustrates an example method 10 of sourcing orders for groups of products. The method 10 includes [12] organizing a plurality of products into a plurality of distinct groups of products. It should be noted that the products in each distinct group of products may include any mixture of one or more different types of products (or product lines). In addition, the products may be fabricated at any number of sources. The method further includes [16] determining a capacity for each distribution center in a plurality of distribution centers to ship the order, and [18] assigning an order to a first distribution center based on the capacity of each distribution center to ship the order. As used herein, "distribution center" includes all potential sources of products, such as mills, production centers, distribution centers or any other facility that can be used to fabricate, ship and/or store products.

In some forms, the method 10 may further include [20] reassigning the order to a second distribution center when the first distribution center is at shipping capacity for the group of products in the order, or [22] reassigning the order to a second distribution center when the first distribution center is near shipping capacity for the group of products in the order. In some example forms of the method 10, the method 10 may further include [24] reassigning the order to a second distribution center when the first distribution center is expected to be near shipping capacity in the future for the group of products in the order.

Assigning, or reassigning, the order to a source based on the shipping capacity of each source for the groups of products in an order adds stability and flexibility to a distribution network. The method readily adjusts the demand for one or more groups of products among various production or distribution centers.

As used herein, "order" may include an order for products that is shipped to multiple locations. It should be noted that the products which are used to fill an order for one or more groups of products may be delivered to a distribution center from any number of sources before an order is shipped to a customer.

In some forms, a maximum capacity may be independently set for each source. The maximum capacities that are associated with each source may govern where orders for groups of products can be assigned, or reassigned, if one or more potential sources are at maximum capacity. As an example, a particular source may be at maximum capacity for a group of products such that an order for such a group of products would be reassigned to another source.

The method 10 may further include [26] arranging the one distinct group of products onto a container to maximize storage on the container. It should be noted that [26] arranging the one distinct group of products onto a container may include arranging the one distinct group of products onto a pallet or truck (among other types of containers).

Figure 2:
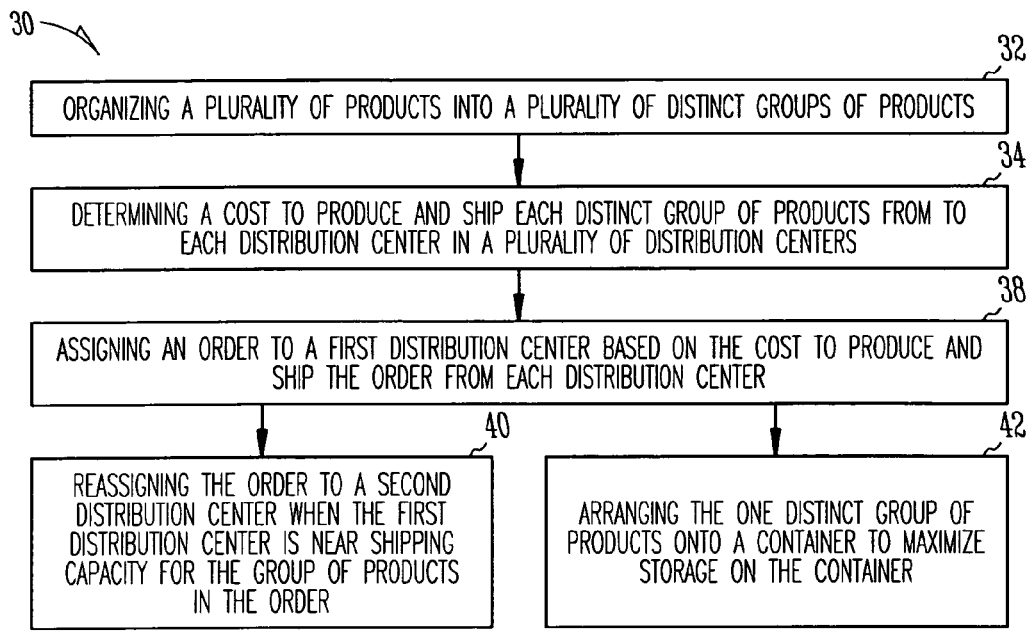
FIG. 2 illustrates another method of sourcing orders for groups of products.

FIG. 2 illustrates another example method 30 of sourcing orders for groups of products. The method 30 includes [32] organizing a plurality of products into a plurality of distinct groups of products, and [34] determining a cost to produce and ship each distinct group of products from each distribution center in a plurality of distribution centers. The method 30 further includes [38] assigning an order to a first distribution center based on the cost to produce and ship the order from each distribution center.

Assigning, or reassigning, an order to a source based on the cost to produce and ship the order reduces the costs associated with filling orders for groups of products. As an example, the costs associated with filling an order for a group of products may be known relative to each potential source for filling the order. Therefore, the order may be readily reassigned from a default source to another source in order to save costs.

In some forms, the method may further include [40] reassigning the order to a second distribution center when the first distribution center is near shipping capacity for the groups of products in the order. The method may also include [42] arranging the one distinct group of products onto a container to maximize storage on the container.

Figure 3:
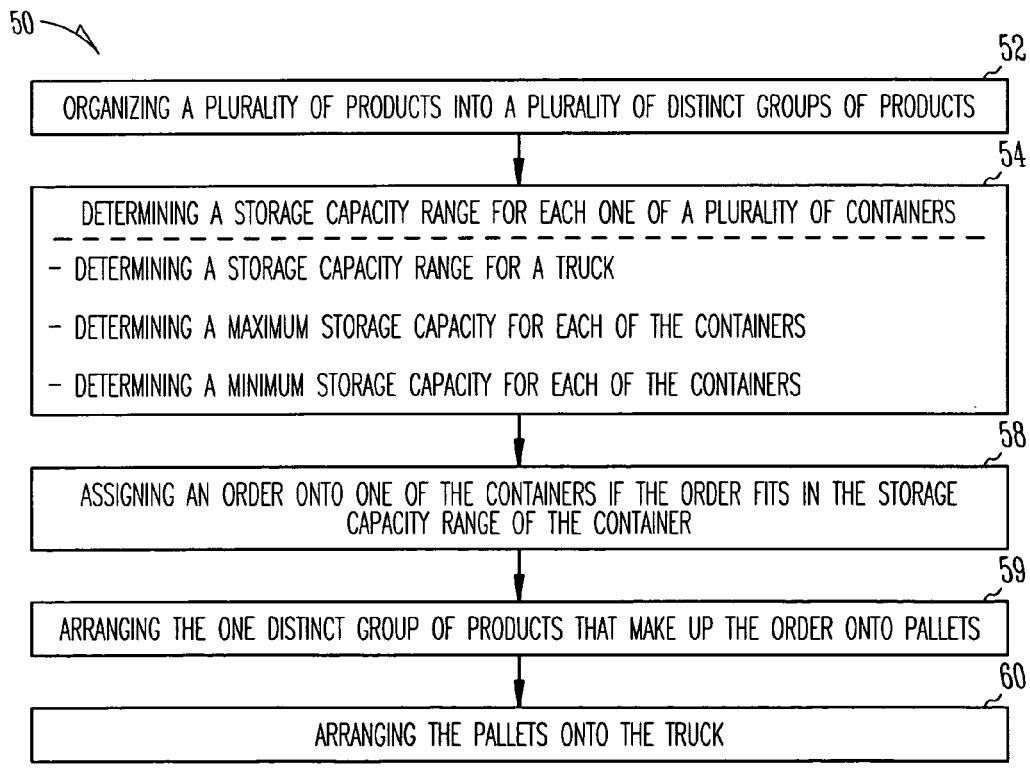
FIG. 3 illustrates yet another method of sourcing orders for groups of products.

FIG. 3 illustrates another example method 50 of sourcing orders for groups of products. The method 50 includes [52] organizing a plurality of products into a plurality of distinct groups of products, and [54] determining a storage capacity range for each one of a plurality of containers. The method further includes [58] assigning an order onto one of the containers if the order fits in the storage capacity range of the container. It should be noted that the method 50 may further include [59] arranging the one distinct group of products that make up the order onto pallets, and [60] arranging the pallets onto a truck.

Determining a storage capacity range for each of the containers, and assigning orders onto the containers based on the storage capacity range of the containers, may (i) prevent orders for groups of products from being shipped on separate containers; and/or (ii) prevent individual products with the groups of products from being shipped on separate containers. Shipping orders on separate containers, especially containers at separate locations, is undesirable because it adds unwanted expense to the cost of filling orders for groups of products.

In some forms of the method 50, [54] determining a storage capacity range for each of the containers may include determining a storage capacity range for a pallet or truck (among other types of containers). In addition, [54] determining a storage capacity range for each of the containers may include determining a maximum and/or minimum storage capacity for each of the containers.

Figure 4:
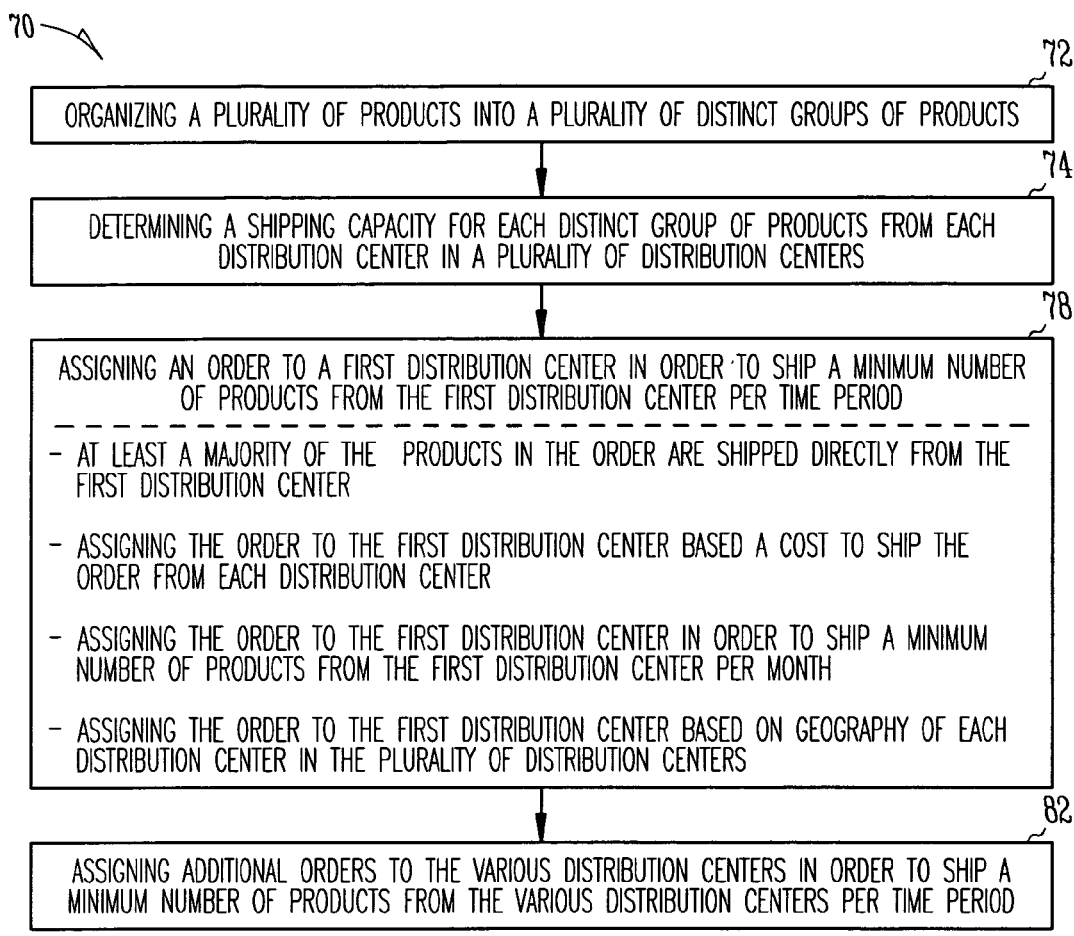
FIG. 4 illustrates still another method of sourcing orders for groups of products.

FIG. 4 illustrates another example method 70 of sourcing orders for groups of products. The method 70 includes [72] organizing a plurality of products into a plurality of distinct groups of products, and [74] determining a shipping capacity for each distinct group of products from each distribution center in a plurality of distribution centers. The method further includes [78] assigning the order to a first distribution center in order to ship a minimum number of products from the first distribution center per time period.

It should be noted that the method 70 may further include [82] assigning additional orders to the various distribution centers in order to ship a minimum number of products from the various distribution centers per time period. The time period may be any length of time (e.g., a day, a week, a month or a year). In addition, any number of sources may be required to ship a minimum number of products per time period. In some forms, the minimum number of products that must be shipped from one, some or all of the sources may vary over time.

In some forms, [78] assigning the order to a first distribution center in order to ship a minimum number of products from the first distribution center per time period may include (i) assigning the order to the first distribution center where at least a majority of the products in the order are shipped directly from the first distribution center; (ii) assigning the order to the first distribution center based on a cost to ship the order from each distribution center; and/or (iii) assigning the order to the first distribution center based on geography each of the distribution center.

The operations discussed above with respect to the described methods may be performed in a different order from those described herein. While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

The invention claimed is:

1. A method implemented by a computer having a processor executing a computer program, the method comprising:
   receiving an order for a plurality of products comprising a plurality of different types of products;
   organizing the plurality of different types of products into distinct groups of products;
   determining, with the computer, a storage capacity for respective shipping containers, including maximum storage capacities for respective shipping containers;
   determining, by the computer, a plurality of the distinct groups of products to assign to a first shipping container based on at least the determined storage capacity of the first shipping container relative to storage requirements for shipping the plurality of distinct groups of products, the plurality of distinct groups of products comprising a plurality of different types of products;
   assigning all of the determined plurality of distinct groups of products to the first shipping container;
   determining, by the computer, capacities for respective distribution centers from a plurality of distribution centers to fill and ship all of the plurality of distinct groups of products assigned to the first shipping container, wherein the capacities for respective distribution centers are determined with respect to all of the plurality of distinct groups of products assigned to the first shipping container;
   selecting, by the computer, a first distribution center from the plurality of distribution centers based on the respective capacities of the distribution centers to fill and ship all of the plurality of distinct groups of products assigned to the first shipping container in order to prevent splitting of the plurality of distinct groups of products among multiple containers; and
   assigning, with the computer, all of the plurality of distinct groups of products to the selected first distribution center.

2. The method of claim 1, further comprising:
   determining, by the computer, costs for respective distribution centers to fill and ship the first shipping container including all of the plurality of distinct groups of products assigned to the first shipping container; and
   reassigning the first shipping container to a second distribution center in response to determining that a cost associated with the second distribution center is less than a cost associated with the first distribution center.

3. The method of claim 1, further comprising:
   determining, by the computer, a shipping capacity of the first distribution center for all of the plurality of distinct groups of products assigned to the first shipping container; and
   reassigning the first shipping container to a second distribution center in response to determining that the first distribution center is near shipping capacity for the plurality of distinct groups of products.

4. The method of claim 1, further comprising:
   determining, by the computer, a shipping capacity of the first distribution center for all of the plurality of distinct groups of products assigned to the first shipping container; and
   reassigning the first shipping container to a second distribution center in response to determining that the first distribution center is expected to be near shipping capacity in the future for the plurality of distinct groups of products.

5. The method of claim 1, further comprising:
   determining an arrangement for the plurality of distinct groups of products for the first shipping container to maximize storage on the first shipping container.

6. The method of claim 5, wherein said determining an arrangement comprises determining an arrangement for the plurality of distinct groups of products on a pallet.

7. The method of claim 5, wherein said determining an arrangement comprises determining an arrangement for the plurality of distinct groups of products on a truck.

8. The method of claim 1, wherein determining a storage capacity for respective containers includes determining a minimum storage capacity for respective containers.

9. The method of claim 1, wherein the first distribution center is selected based on an ability of the first distribution center to fill and ship all of the plurality of distinct groups of products using a same or lesser number of containers than other distribution centers from the plurality of distribution centers.

10. The method of claim 1, wherein the first distribution center includes a plurality of different sized containers for shipping products.

11. A method implemented by a computer having a processor executing a computer program, the method comprising:
   receiving an order for a plurality of products comprising a plurality of different types of products;
   organizing the plurality of different types of products into distinct groups of products;
   determining, by the computer, a plurality of the distinct groups of products to assign to a first container based on at least a determined storage capacity of the first container relative to storage requirements for transporting the plurality of distinct groups of products, the plurality of distinct groups of products comprising a plurality of different types of products;
   assigning all of the determined plurality of distinct groups of products to a first container;
   determining, by the computer, costs for respective distribution centers from a plurality of distribution centers to fill and ship the first container including all of the plurality of distinct groups of products assigned to the first container;
   selecting, by the computer, a first distribution center from the plurality of distribution centers based on the respective costs of the distribution centers to fill and ship the first container, including all of the plurality of distinct groups of products assigned to the first container, in order to prevent splitting of the plurality of distinct groups of products among multiple containers; and assigning all of the plurality of distinct groups of products to the selected first distribution center.

12. The method of claim 11, further comprising:

determining, with the computer, a capacity of the first distribution center to transport all of the plurality of the distinct groups of products assigned to the first container; and reassigning the first container to a second distribution center when the first distribution center is near capacity for transporting the plurality of distinct groups of products.

13. The method of claim 11, further comprising determining an arrangement for the plurality of distinct groups of products on the first container to maximize storage on the first container.

14. The method of claim 11, wherein determining a storage capacity range for respective containers includes determining a minimum storage capacity for respective containers.

15. The method of claim 11, wherein the first distribution center is selected based on an ability of the first distribution center to fill and ship all of the plurality of distinct groups of products using a same or lesser number of containers than other distribution centers from the plurality of distribution centers.

16. The method of claim 11, wherein the first distribution center includes a plurality of different sized containers for shipping products.

17. A system comprising:

a computer having a processor executing a computer program, the computer configured to:

determine a group of products comprising different types of products to assign to a first container based on at least a determined storage capacity of the first container relative to storage requirements for shipping the group of products;

determine capacities for respective sources from a plurality of sources to supply the first container including the group of products assigned to the first container, the capacities of respective sources determined with respect to the group of products in its entirety;

select a first source from the plurality of sources based at least partly on determining that a capacity of the first source to supply the entire group of products is higher than capacities of respective other sources to supply the entire group of products; and designate the first source as supplier for the entire group of products assigned to the first container.

18. The system of claim 17, wherein the first source is selected based at least partly on costs for respective of the plurality of sources to supply the entire group of products assigned to the first container, the costs based at least partly on relative locations of respective sources to a destination for the first container.

19. The system of claim 17, wherein the computer is configured to:

determine one or more sources having supplied an amount of product during a particular time period that is below respective threshold amounts for the respective one or more sources, wherein the first source is selected from the determined one or more sources.

20. The system of claim 19, wherein the respective threshold amounts are based at least partly on contracts associated with respective distribution centers.

21. The system of claim 17, wherein the first source includes a plurality of different sized containers for shipping products.

* * * * *

UNITED STATES PATENT AND TRADEMARK OFFICE
CERTIFICATE OF CORRECTION

PATENT NO. : 8,407,096 B2  
APPLICATION NO. : 10/746123  
DATED : March 26, 2013  
INVENTOR(S) : Mathe et al.

Page 1 of 1

It is certified that error appears in the above-identified patent and that said Letters Patent is hereby corrected as shown below:

On the Title Page, item "(58)", under "Field of Classification Search",
in Column 1, Line 2, delete "705/26" and insert -- 705/26.1 --, therefor.

In the Drawings:

In Fig. 2, Sheet 2 of 3, for Tag "34", Line 1, delete "FROM TO" and insert -- FROM --, therefor.

In the Specifications:

In Column 3, Line 14, delete "there in" and insert -- there is --, therefor.

Signed and Sealed this
Sixteenth Day of July, 2013

Teresa Stanek Rea
*Acting Director of the United States Patent and Trademark Office*